US008160266B2

(12) United States Patent
Inoue et al.

(10) Patent No.: US 8,160,266 B2
(45) Date of Patent: Apr. 17, 2012

(54) ACTIVE VIBRATORY NOISE CONTROL APPARATUS MATCHING CHARACTERISTICS OF AUDIO DEVICES

(75) Inventors: Toshio Inoue, Tochigi-ken (JP); Akira Takahashi, Tochigi-ken (JP); Satoru Minowa, Mooka (JP); Yoshio Nakamura, Neyagawa (JP); Masahide Onishi, Osaka (JP)

(73) Assignees: Honda Motor Co. Ltd., Tokyo (JP); Panasonic Corporation, Osaka (JP)

( * ) Notice: Subject to any disclaimer, the term of this patent is extended or adjusted under 35 U.S.C. 154(b) by 1189 days.

(21) Appl. No.: 10/869,214

(22) Filed: Jun. 17, 2004

(65) Prior Publication Data

US 2004/0258252 A1 Dec. 23, 2004

(30) Foreign Application Priority Data

Jun. 17, 2003 (JP) ................................ 2003-171742

(51) Int. Cl.
*H04B 1/00* (2006.01)

(52) U.S. Cl. ........ 381/86; 381/71.1; 381/71.2; 381/71.4

(58) Field of Classification Search .................... 381/86, 381/56–59, 71.1–71.14, 94.1–94.9
See application file for complete search history.

(56) References Cited

U.S. PATENT DOCUMENTS 5,359,662 A * 10/1994 Yuan et al. ................. 381/71.14
5,426,705 A * 6/1995 Yokota et al. ................ 381/71.4
5,485,523 A * 1/1996 Tamamura et al. .......... 381/71.4
5,488,667 A * 1/1996 Tamamura et al. .......... 381/71.4
5,493,616 A * 2/1996 Iidaka et al. ................ 381/71.4
5,540,633 A 7/1996 Yamanaka et al.
5,581,619 A * 12/1996 Shibata et al. ............... 381/71.4
5,768,124 A * 6/1998 Stothers et al. ................. 700/38
5,809,152 A * 9/1998 Nakamura et al. ........... 381/71.8
5,939,625 A * 8/1999 Torii et al. .................. 73/117.01
6,588,392 B2 7/2003 Armstrong et al.
6,891,954 B2 * 5/2005 Takahashi et al. ........... 381/71.4
6,912,286 B1 * 6/2005 Daly ............................ 381/71.1
7,050,591 B2 * 5/2006 Marumoto ...................... 381/58
2003/0034002 A1 2/2003 Armstrong et al.
2004/0055814 A1 3/2004 Chae et al.

FOREIGN PATENT DOCUMENTS

DE 42 36 155 A1 4/1994
EP 274 659 A1 7/1988
EP 0 568 128 A2 11/1993
JP 61-212638 9/1986
JP 04-234098 A 8/1992
JP 05-216484 8/1993
JP 05-224679 A 9/1993
JP 5-333880 A 12/1993
JP 06-130971 5/1994

(Continued)

*Primary Examiner* — Vivian Chin
*Assistant Examiner* — Fatimat O Olaniran
(74) *Attorney, Agent, or Firm* — Arent Fox LLP

(57) ABSTRACT

An active vibratory noise control apparatus has a speaker for canceling vibratory noise in the passenger compartment of a vehicle, the speaker being used as a speaker of one of different audio devices that can be installed on the vehicle. Each of the audio devices has a command key switch assembly. When the command key switch assembly is operated to turn off the transistor, a control signal is applied to a switching control circuit in an active vibratory noise control unit, which identifies the audio device installed on the vehicle. The active vibratory noise control unit generates a canceling signal matching characteristics of the speaker of the identified audio device for canceling vibratory noise in the passenger compartment.

5 Claims, 10 Drawing Sheets

FOREIGN PATENT DOCUMENTS

| | | | |
|---|---|---|---|
| JP | 06-282281 | A | 10/1994 |
| JP | 06-295187 | | 10/1994 |
| JP | 7-20884 | A | 1/1995 |
| JP | 7-140987 | A | 6/1995 |
| JP | 7-160278 | A | 6/1995 |
| JP | 7-182840 | A | 7/1995 |
| JP | 7-199966 | A | 8/1995 |
| JP | 7-199971 | A | 8/1995 |
| JP | 07-219560 | | 8/1995 |
| JP | 07-248780 | A | 9/1995 |
| JP | 7-287583 | A | 10/1995 |
| JP | 08-076772 | | 3/1996 |
| JP | 8-246910 | A | 9/1996 |
| JP | 08-319912 | A | 12/1996 |
| JP | 09-319381 | A | 12/1997 |
| JP | 2000-120767 | A | 4/2000 |
| JP | 2000-267674 | | 9/2000 |
| JP | 2001-005463 | A | 1/2001 |
| JP | 2001-282255 | A | 10/2001 |
| JP | 2001-282256 | A | 10/2001 |
| JP | 2001-282257 | A | 10/2001 |
| JP | 2001-329874 | A | 11/2001 |

* cited by examiner

FIG. 3

| CONTROL SIGNAL VOLTAGE VALUE | ACTIVE VIBRATORY NOISE CONTROL UNIT |
|---|---|
| H | NORMAL OPERATION |
| L | DISABLED |

FIG. 6

| CONTROL SIGNAL VOLTAGE VALUE | AUDIO DEVICE | CORRECTIVE DATA |
|---|---|---|
| H1 | AUDIO DEVICE OF STANDARD SPECIFICATIONS | CA |
| H2 | AUDIO DEVICE OF PREMIUM SPECIFICATIONS | CB |
| L | FAILURE DIAGNOSING MODE | |

ACTIVE VIBRATORY NOISE CONTROL APPARATUS MATCHING CHARACTERISTICS OF AUDIO DEVICES

CROSS-REFERENCE TO RELATED APPLICATION

This application claims the priority of Japan Application No. 2003-171742, filed Jun. 17, 2003, the entire specifications, claims and drawings of which are incorporated herewith by reference.

BACKGROUND OF THE INVENTION

1. Field of the Invention

The present invention relates to an active vibratory noise control apparatus for supplying an audio signal output from an audio unit and a canceling signal which serves to cancel vibratory noise in a passenger compartment of a vehicle to a common speaker unit, which converts the supplied signals into a reproduced sound.

2. Description of the Related Art

Heretofore, there has been proposed an active vibratory noise control apparatus for supplying an audio signal output from an audio unit and a canceling signal which serves to cancel vibratory noise in the passenger compartment of a vehicle to a common speaker unit, which converts the supplied signals into a reproduced sound (for example, see Japanese laid-open patent publication No. 6-130971).

As shown in FIG. 9 of the accompanying drawings, one example of such an active vibratory noise control apparatus has an active vibratory noise control unit 30-3, an audio unit 70, and a speaker unit 41.

The audio unit 70 has a sound source device 49 and an adder circuit 51. One audio sound source is selected from the sound source device 49, and an audio signal output from the selected audio sound source is supplied to the adder circuit 51.

The speaker unit 41 has an amplifier 42 and a speaker 43 disposed in the passenger compartment. A signal output from the adder circuit 51 is amplified by the amplifier 42, which supplies an output signal to the speaker 43 to convert the signal into a reproduced sound.

The cancellation of vibratory noise produced by an engine as a vibratory noise source, e.g., vibratory noise produced in the passenger compartment of a vehicle by the rotation of a 4-cycle 4-cylinder engine, will be described by way of example below. The 4-cycle 4-cylinder engine produces vibrations due to torque variations thereof upon gas combustion each time the engine output shaft makes one-half of a revolution, causing vibratory noise in the passenger compartment of the vehicle. The 4-cycle 4-cylinder engine produces a lot of vibratory noise that is referred to as a rotational secondary component having a frequency which is twice the rotational speed of the engine output shaft.

In the active vibratory noise control unit 30-3, a basic signal generating circuit 2 generates a basic signal which is a digital signal having a frequency selected from the frequencies of vibratory noise generated by a vibratory noise source, and an adaptive filter 4 generates a canceling signal which serves to cancel vibratory noise in the passenger compartment based on the basic signal. A reference signal generating circuit 5-1 corrects the basic signal from the basic signal generating circuit 2 based on corrective data depending on signal transfer characteristics to generate a reference signal. A microphone 27 disposed in the passenger compartment detects an error signal based on the vibratory noise in the passenger compartment. Based on the reference signal from the reference signal generating circuit 5-1 and the error signal, an LMS algorithm processing circuit 6 calculates filter coefficients of the adaptive filter 4 so as to minimize the error signal, and successively updates the filter coefficients of the adaptive filter 4 for the adaptive filter 4 to generate a canceling signal to minimize the error signal.

The basic signal generating circuit 2, the adaptive filter 4, the reference signal generating circuit 5-1, and the LMS algorithm processing circuit 6 are implemented by a microcomputer 20-3.

The canceling signal generated by the adaptive filter 4 is added to the audio signal output from the sound source device 49 by the adder circuit 51, which outputs a sum signal to drive the speaker unit 41. Therefore, the speaker unit 41 for generating a reproduced sound based on the audio signal output from the audio unit 70 doubles as a speaker unit for generating a canceling sound based on the canceling signal output from the active vibratory noise control unit 30-3.

The signal transfer characteristics referred to above range from the adaptive filter 4 to the LMS algorithm processing circuit 6. The active vibratory noise control unit 30-3 corrects the basic signal using the corrective data based on the signal transfer characteristics, and generates the canceling signal matching the signal transfer characteristics from the adaptive filter 4.

For measuring actual signal transfer characteristics of the active vibratory noise control apparatus, as indicated by the broken lines in FIG. 9, a signal transfer characteristics measuring circuit 100 comprising a Fourier transform device is connected between the output terminal of the adaptive filter 4 and the error signal input terminal of the LMS algorithm processing circuit 6. The signal transfer characteristics measuring circuit 100 measures signal transfer characteristics between the output terminal of the adaptive filter 4 and the error signal input terminal of the LMS algorithm processing circuit 6 across the passenger compartment.

Therefore, the measured signal transfer characteristics include signal transfer characteristics due to a D/A converter 21, a low-pass filter 22, the adder circuit 51 and an amplifier 42 which are connected from the output terminal of the adaptive filter 4 to the speaker 43, and an amplifier 23, a bandpass filter 24, and an A/D converter 25 which are connected from the microphone 27 to the LMS algorithm processing circuit 6.

Audio devices for use on vehicles include audio devices having an ordinary configuration (also referred to as audio devices of standard specifications) where an audio unit is mounted in the instrument panel of a vehicle and a speaker unit comprises an amplifier and speakers that are located in predetermined positions in the passenger compartment of the vehicle, and audio devices based on premium specifications (also referred to as audio devices of premium specifications) where an audio unit is mounted in the instrument panel of a vehicle and a speaker unit comprises an equalizer, an amplifier, and speakers that are located in predetermined positions in the passenger compartment of the vehicle for producing high-fidelity, high-power playback audio signals. Audio devices of different configurations are incorporated in different vehicles depending on different vehicle types and classes.

As a result, signal transfer characteristics in vehicles which incorporate different audio devices are different as indicated by the broken- and solid-line curves as shown in FIGS. 10A and 10B of the accompanying drawings, based on the audio devices. FIG. 10A shows gain characteristics in the signal transfer characteristics, and FIG. 10B show phase characteristics in the signal transfer characteristics. The broken-line curves represent the characteristics of an audio device of standard specifications, and the solid-line curves represent the characteristics of an audio device of premium specifications.

Therefore, it is necessary to provide a plurality of active vibratory noise control units, each sharing the speaker unit with the audio device in use for matching signal transfer characteristics, depending on the speaker units of audio devices that are available for use.

As a consequence, there need to be an increased number of combinations of audio devices for use on vehicles and active vibratory noise control units, posing a problem in that active vibratory noise control units of wrong types may possibly be installed in combination with audio devices on vehicles.

SUMMARY OF THE INVENTION

It is an object of the present invention to provide an active vibratory noise control apparatus which can reduce the number of different types of active vibratory noise control units that need to be available, is effective to prevent active vibratory noise control units of wrong types from being installed on vehicles, and can easily be diagnosed for failures.

According to the present invention, there is provided an active vibratory noise control apparatus comprising an audio device having a speaker for outputting a reproduced sound, and an active vibratory noise control unit for generating a canceling signal to reduce vibratory noise in a passenger compartment of a vehicle and outputting the canceling signal to the speaker, the active vibratory noise control unit being arranged to generate a canceling signal matching characteristics of the speaker based on a control signal from the audio device.

The above active vibratory noise control apparatus determines the characteristics of the speaker based on the control signal from the audio device, and automatically generates the canceling signal that matches the characteristics of the speaker. The active vibratory noise control unit can be managed and assembled with ease, and is prevented from being assembled in error.

According to the present invention, there is also provided an active vibratory noise control apparatus comprising an audio device having an amplifier for amplifying an audio signal and a speaker for converting the audio signal into a reproduced sound, and an active vibratory noise control unit for generating a canceling signal to reduce vibratory noise in a passenger compartment of a vehicle and outputting the canceling signal through the amplifier to the speaker, the active vibratory noise control unit being arranged to generate a canceling signal matching characteristics of the amplifier or the speaker based on a control signal from the audio device.

The above active vibratory noise control apparatus determines the characteristics of the amplifier or the speaker of the audio device based on the control signal from the audio device, and automatically generates the canceling signal that matches the characteristics of the amplifier or the speaker. The active vibratory noise control unit can be managed and assembled with ease, and is prevented from being assembled in error.

In the active vibratory noise control apparatus, the active vibratory noise control unit stops outputting the canceling signal based on the control signal from the audio device.

When the active vibratory noise control unit stops outputting the canceling signal based on the control signal from the audio device, the operator is allowed to confirm the noise control capability of the active vibratory noise control apparatus when it is in operation. Consequently, during the manufacturing process of the active vibratory noise control apparatus or at a car dealer, the active vibratory noise control apparatus can be diagnosed for a failure based on the control signal from the audio device. A failure such as a wire disconnection or the like between the active vibratory noise control unit and the speaker or an error signal detecting means can easily be confirmed.

The active vibratory noise control unit comprises basic signal generator means for outputting a basic signal having a frequency selected from the frequencies of vibratory noise generated by a vibratory noise source, an adaptive filter for outputting a canceling signal based on the basic signal in order to cancel vibratory noise in the passenger compartment, error signal detecting means for detecting vibratory noise in the passenger compartment and outputting an error signal representing the detected vibratory noise, reference signal generating means for generating a reference signal based on the basic signal, and filter coefficient updating means for sequentially updating filter coefficients of the adaptive filter to minimize the error signal based on the error signal and the reference signal, the reference signal generating means being arranged to have a plurality of corrective values depending on signal transfer characteristics ranging from an output of the adaptive filter to an input of the filter coefficient updating means, and correct the basic signal with one of the corrective values which is selected based on the control signal from the audio device and output the corrected basic signal as a reference signal.

With the above active vibratory noise control apparatus, a plurality of corrective values depending on signal transfer characteristics are stored, one of the stored corrective values which matches the amplifier or the speaker of the audio device is selected based on the control signal from the audio device, and the canceling signal is output based on the selected corrective value. Therefore, the canceling signal matching the amplifier or the speaker can be generated automatically.

According to the present invention, there is also provided an active vibratory noise control apparatus comprising an audio device having a speaker for outputting a reproduced sound, and an active vibratory noise control unit for generating a canceling signal to reduce vibratory noise in a passenger compartment of a vehicle and outputting the canceling signal to the speaker, the active vibratory noise control unit being arranged to shift into a failure diagnosing mode based on a control signal from the audio device.

The above active vibratory noise control apparatus is brought into the failure diagnosing mode based on the control signal from the audio device. Consequently, during the manufacturing process of the active vibratory noise control apparatus or at a car dealer, the active vibratory noise control apparatus can be diagnosed for a failure based on the control signal from the audio device. A failure such as a wire disconnection or the like between the active vibratory noise control unit and the speaker or an error signal detecting means can easily be confirmed.

The active vibratory noise control unit outputs a basic signal having an audio frequency when the active vibratory noise control unit shifts into the failure diagnosing mode. The active vibratory noise control apparatus further comprises error signal detecting means for detecting an error signal. When the active vibratory noise control unit shifts into the failure diagnosing mode, the active vibratory noise control unit determines whether there is a failure or not based on an input signal from the error signal detecting means, and stops outputting the basic signal if it is judged that there is a failure.

Inasmuch as the active vibratory noise control unit outputs a basic signal having an audio frequency when the active vibratory noise control unit shifts into the failure diagnosing mode, if no sound at all is produced from the speaker when the active vibratory noise control unit is brought into the failure diagnosing mode by an action made on the audio device, then the active vibratory noise control apparatus can be judged as malfunctioning or a wire disconnection between the active vibratory noise control apparatus and the speaker can be determined. If no sound is produced from the speaker after elapse of a certain period of time, then a wire disconnection between the active vibratory noise control apparatus and the error signal detecting means can be determined. Accordingly, the location of a failure or malfunction can simply be identified.

The active vibratory noise control unit stops outputting the basic signal while an engine of the vehicle is operating in the failure diagnosing mode.

In the failure diagnosing mode, if a sound is produced from the speaker though the engine has started to operate, then an input system of the active vibratory noise control unit can be judged as malfunctioning or a wire disconnection thereof may be determined. Therefore, the location of a failure or malfunction can be identified in specific detail.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a diagram illustrative of the manner in which the active vibratory noise control apparatus according to the embodiment of the present invention operates;

FIG. 6 is a diagram illustrative of the states of a control signal in the active vibratory noise control apparatus according to the other embodiment of the present invention, and the selection of audio devices and corrective data;

DESCRIPTION OF THE PREFERRED EMBODIMENTS

Active vibratory noise control apparatus according to different embodiments of the present invention will be described below. In each of the embodiments to be described below, an active vibratory noise control apparatus is combined with an audio device of standard specifications installed on a vehicle, and also with an audio device of premium specifications installed on a vehicle.

Figure 1:
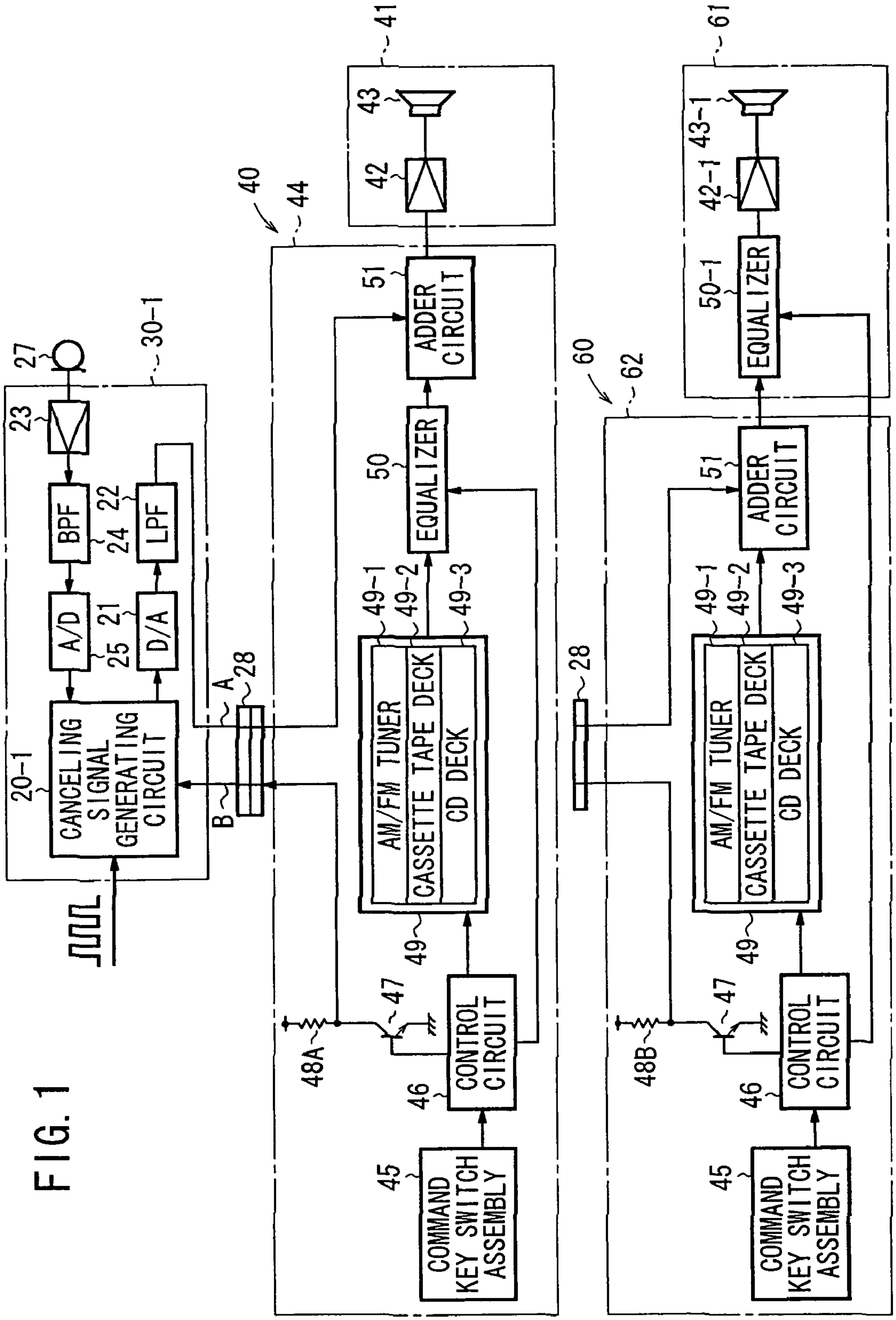
FIG. 1 is a block diagram of an active vibratory noise control apparatus according to an embodiment of the present invention, the active vibratory noise control apparatus being combined with an audio device of standard specifications installed on a vehicle.
Figure 2:
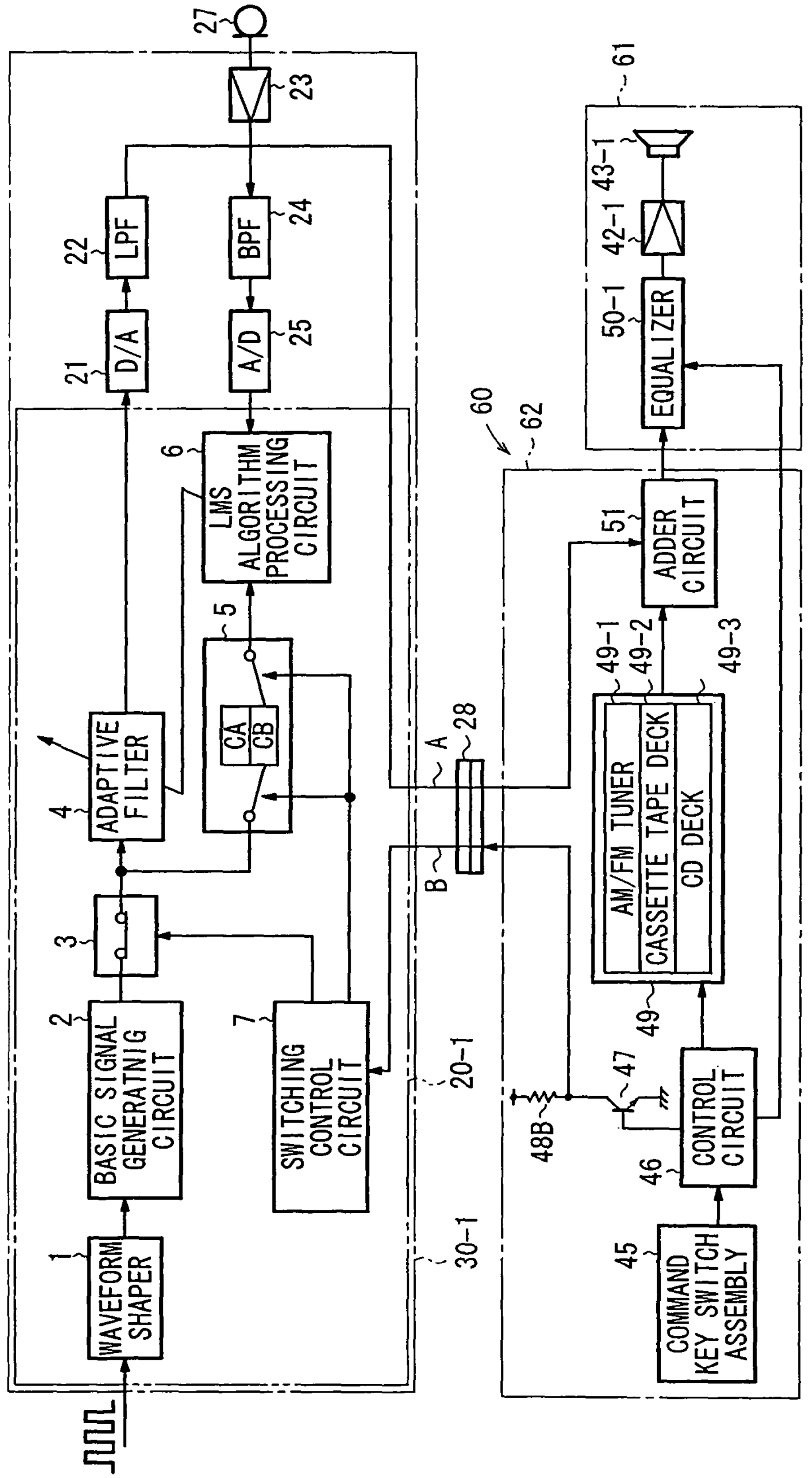
FIG. 2 is a block diagram of the active vibratory noise control apparatus according to the embodiment of the present invention, the active vibratory noise control apparatus being combined with an audio device of premium specifications installed on a vehicle.

FIGS. 1 and 2 show in block form an active vibratory noise control apparatus according to an embodiment of the present invention. FIG. 1 shows the active vibratory noise control apparatus having an active vibratory noise control unit electrically connected to an audio device of standard specifications by a coupler, and FIG. 2 shows the active vibratory noise control apparatus having an active vibratory noise control unit electrically connected to an audio device of premium specifications by a coupler.

In FIG. 1, an active vibratory noise control unit 30-1 is shown as being combined with an audio device 40 of standard specifications installed on a vehicle, and is also shown as being combinable with an audio device 60 of premium specifications installed on a vehicle. The active vibratory noise control unit 30-1 is electrically connected to the audio device 40 of standard specifications by a coupler 28. Alternatively, the active vibratory noise control unit 30-1 may be electrically connected to the audio device 60 of premium specifications, rather than the audio device 40 of standard specifications, by a coupler 28.

The audio device 40 of standard specifications has an audio unit 44 and a speaker unit 41.

The audio unit 44 has a sound source device 49 comprising an AM/FM tuner 49-1, a cassette tape deck 49-2, and a CD deck 49-3, each serving as an audio sound source, an equalizer 50, an adder circuit 51, a control circuit 46 comprising a microcomputer, and a command key switch assembly 45 comprising a power on/off switch, a volume control, a sound source selector switch, a channel selection switch, a balance control, and a mute switch, which can be operated by the operator.

The control circuit 46 selects an audio sound source from the sound source device 49 which is indicated by a selection signal entered from the command key switch assembly 45. The selected audio sound source starts operating, and supplies an output audio signal to the equalizer 50, which compensates for frequency characteristics of the audio signal. The audio signal output from the equalizer 50 is supplied to the adder circuit 51 wherein it is added to a canceling signal supplied from the active vibratory noise control unit 30-1 via the coupler 28.

The speaker unit 41 comprises an amplifier 42 and a speaker 43 disposed in the passenger compartment of the vehicle. A sum signal output from the adder circuit 51 is amplified by the amplifier 42, which supplies an output signal to the speaker 43 to convert the signal into a reproduced sound.

The audio unit 44 is mounted in the instrument panel of the vehicle, and the amplifier 42 and the speaker 43 of the speaker unit 41 are located in predetermined positions in the passenger compartment.

The audio unit 44 also has an emitter-grounded transistor 47 serving as a control signal generating means for generating a control signal and a collector resistor 48A serving as a pull-up resistor having a terminal connected to a power supply. The other terminal of the collector resistor 48A is connected to the active vibratory noise control unit 30-1 through the coupler 28. The control circuit 46 outputs a signal to the base of the transistor 47 for controlling the turning-on and -off of the transistor 47.

Normally, the control circuit 46 does not apply a signal to the base of the transistor 47, and hence keeps the transistor 47 turned off. Therefore, a high-potential output signal (H1) supplied from the power supply through the resistor 48A is applied as a control signal via the coupler 28 to the active vibratory noise control unit 30-1. When a certain action, different from normal actions for operating the audio device, made on the command key switch assembly 45 is detected by the control circuit 46, e.g., when the power on/off switch is pressed a predetermined number of times while the mute switch is being pressed, the control circuit 46 supplies a base current to the transistor 47 to turn on the transistor 47. Now, a low-potential output signal (ground potential L) is applied as a control signal via the coupler 28 to the active vibratory noise control unit 30-1.

The active vibratory noise control unit 30-1 has a canceling signal generating circuit 20-1 for generating a canceling signal. As shown in FIG. 2, the canceling signal generating circuit 20-1, which may be implemented by a microcomputer, has a waveform shaper 1, a basic signal generating circuit 2, an on-off switch 3, an adaptive filter 4, a reference signal generating circuit 5, an LMS algorithm processing circuit 6 serving as a filter coefficient updating means, and a switching control circuit 7 which is supplied with a control signal via the coupler 28.

The active vibratory noise control unit 30-1 also has a D/A converter 21 for converting a digital canceling signal output from the canceling signal generating circuit 20-1 into an analog canceling signal, a low-pass filter 22 for filtering and supplying the analog canceling signal via the coupler 28 to the adder circuit 51, an amplifier 23 for amplifying an error signal detected by a microphone 27 serving as an error signal detecting means, a bandpass filter 24 for being supplied with an amplified error signal output from the amplifier 23, and an A/D converter 25 for converting an analog error signal output from the bandpass filter 24 into a digital error signal and supplying the digital error signal to the canceling signal generating circuit 20-1.

As described above, the cancellation of vibratory noise produced by an engine as a vibratory noise source, e.g., vibratory noise produced in the passenger compartment of a vehicle by the rotation of a 4-cycle 4-cylinder engine, will be described by way of example below. The 4-cycle 4-cylinder engine produces vibrations due to torque variations thereof upon gas combustion each time the engine output shaft makes one-half of a revolution, causing vibratory noise in the passenger compartment of the vehicle. The 4-cycle 4-cylinder engine produces a lot of vibratory noise that is referred to as a rotational secondary component having a frequency which is twice as high as the rotational speed of the engine output shaft.

The rotation of the engine output shaft is detected by a sensor, which supplies an output signal to the waveform shaper 1. The waveform shaper 1 shapes the waveform of the supplied signal and supplies the waveform-shaped signal to the basic signal generating circuit 2, which generates a digital basic signal having a frequency selected from the frequencies of vibratory noise generated by a vibratory noise source, e.g., a basic signal having the frequency of the rotational secondary component.

The basic signal is supplied via the on-off switch 3 to the adaptive filter 4, which processes the basic signal into a canceling signal for canceling the vibratory noise in the passenger compartment. The canceling signal is output from the adaptive filter 4 to the D/A converter 21 and converted thereby into an analog canceling signal, which is applied to the low-pass filter 22. The analog canceling signal is then supplied from the low-pass filter 22 via the coupler 28 to the adder circuit 51.

The microphone 27 located in the passenger compartment detects the vibratory noise in the passenger compartment, and produces an error signal representative of the vibratory noise. The error signal output from the microphone 27 is amplified by the amplifier 23, limited in band by the bandpass filter 24, and then converted into a digital error signal by the A/D converter 25.

The reference signal generating circuit 5 stores in advance corrective data CA based on the signal transfer characteristics of the speaker unit 41 of the audio device 40 of standard specifications, and corrective data CB based on the signal transfer characteristics of the speaker unit 61 of the audio device 60 of premium specifications. The reference signal generating circuit 5 selectively reads either the corrective data CA or the corrective data CB depending on the audio device 40 or 60 that is combined with the active vibratory noise control unit 30-1, and corrects the basic signal from the basic signal generating circuit 2 based on the corrective data CA or the corrective data CB that is read, thereby generating a reference signal.

Based on the reference signal output from the reference signal generating circuit 5 and the error signal from the A/D converter 25, the LMS algorithm processing circuit 6 performs LMS algorithm calculations and sequentially updates the filter coefficients of the adaptive filter 4 so as to minimize the error signal based on the results of the LMS algorithm calculations. The adaptive filter 4 outputs a canceling signal to the adder circuit 51, which adds the canceling signal to the audio signal output from the equalizer 50. The sum signal from the adder circuit 51 is amplified by the amplifier 42 and converted by the speaker 43 into a reproduced sound, which cancels the vibratory noise in the passenger compartment.

If the audio device 40 of standard specifications is combined with the active vibratory noise control unit 30-1, then the signal transfer characteristics include signal transfer characteristics ranging from the speaker unit 41 to the microphone 27, and also signal transfer characteristics ranging from the output terminal of the adaptive filter 4 to the input terminal of the LMS algorithm processing circuit 6, i.e., the D/A converter 21, the low-pass filter 22, the adder circuit 51, the amplifier 42, the speaker 43, the microphone 27, the amplifier 23, the bandpass filter 24, and the A/D converter 25. The same is applied to signal transfer characteristics in the combination of the audio device 60 of premium specifications and the active vibratory noise control unit 30-1.

The corrective data CA are based on the signal transfer characteristics that are provided when audio device 40 of standard specifications is combined with the active vibratory noise control unit 30-1, and the corrective data CB are based on the signal transfer characteristics that are provided when the audio device 60 of premium specifications is combined with the active vibratory noise control unit 30-1.

The active vibratory noise control unit 30-1 may alternatively be combined with the audio device 60 of premium specifications that is installed on the vehicle. In this case, as shown in FIG. 2, the active vibratory noise control apparatus includes the active vibratory noise control unit 30-1 and the audio device 60 of premium specifications. The active vibratory noise control unit 30-1 shown in FIG. 2 is identical to the active vibratory noise control unit 30-1 shown in FIG. 1.

The audio device 60 of premium specifications comprises an audio unit 62 and a speaker unit 61. The audio unit 62 has a command key switch assembly 45, a control circuit 46, a sound source device 49, and a coupler 28, and is free of an equalizer. An audio signal output from an audio sound source that is selected from the sound source device 49 is supplied to an adder circuit 51, which adds the audio signal to a canceling signal supplied from the active vibratory noise control unit 30-1.

The speaker unit 61 comprises an equalizer 50-1, an amplifier 42-1, and a speaker 43-1. A sum signal output from the adder circuit 51 is frequency-compensated by the equalizer 50-1, amplified by the amplifier 42-1, and converted into a reproduced sound by the speaker 43-1.

The equalizer 50-1 is a high-functionality equalizer having more adjustable frequency points and wider frequency adjusting intervals than the equalizer of the audio device 40 of standard specifications. The amplifier 42-1 is a high-performance amplifier having a larger power output capability and a wider bandwidth than the amplifier of the audio device 40 of standard specifications. The speaker 43-1 is a high-performance speaker having a wider reproduced frequency band than the speaker of the audio device 40 of standard specifications.

The audio unit 62 also has an emitter-grounded transistor 47 serving as a control signal generating means for generating a control signal and a collector resistor 48B having a terminal connected to a power supply. The other terminal of the collector resistor 48B is connected to the active vibratory noise control unit 30-1 through the coupler 28. The control circuit 46 outputs a signal to the base of the transistor 47 for controlling the turning-on and -off of the transistor 47.

Normally, the control circuit 46 does not apply a signal to the base of the transistor 47, and hence keeps the transistor 47 turned off. Therefore, a high-potential output signal (H2<H1) supplied from the power supply through the resistor 48B is applied as a control signal via the coupler 28 to the active vibratory noise control unit 30-1. When a certain action, different from normal actions for operating the audio device, made on the command key switch assembly 45 is detected by the control circuit 46, e.g., when the power on/off switch is pressed a predetermined number of times while the mute switch is being pressed, the control circuit 46 supplies a base current to the transistor 47 to turn on the transistor 47. Now, a low-potential output signal (ground potential L) is applied as a control signal via the coupler 28 to the active vibratory noise control unit 30-1.

The active vibratory noise control unit 30-1 is electrically connected to the audio device 40 or 60 by the coupler 28 through two signal lines A, B. The signal line A serves to transmit a canceling signal from the active vibratory noise control unit 30-1 to the audio device 40 or 60, whereas the other signal line B serves to transmit a control signal from the audio device 40 or 60 to the active vibratory noise control unit 30-1.

When the active vibratory noise control unit 30-1 is electrically connected to the audio device 40 or 60 by the coupler 28, a voltage depending on the resistance of the collector resistor 48A or 48B is applied to the canceling signal generating circuit 20-1 of the active vibratory noise control unit 30-1. Specifically, when the active vibratory noise control unit 30-1 is electrically connected to the audio device 40 of standard specifications, a voltage of 5 V (H1) is applied from the audio device 40 to the switching control circuit 7, and when the active vibratory noise control unit 30-1 is electrically connected to the audio device 60 of premium specifications, a voltage of 2.5 V (H2) is applied from the audio device 60 to the switching control circuit 7.

The switching control circuit 7 determines the specifications of the audio device which is installed on the vehicle and combined with the active vibratory noise control unit 30-1, based on the voltage value of the control signal that is supplied from the audio device.

If the switching control circuit 7 judges that the audio device 40 of standard specifications is installed on the vehicle and electrically connected to the active vibratory noise control unit 30-1, then the voltage value of the control signal is of a high potential (H1), and the switching control circuit 7 controls the on-off switch 3 to shift to a contact position (ON position) shown in FIG. 2, and reads the corrective data CA from the reference signal generating circuit 5. Based on the read corrective data CA, the reference signal generating circuit 5 corrects the basic signal from the basic signal generating circuit 2, thereby generating a reference signal. The LMS algorithm processing circuit 6 updates the filter coefficients of the adaptive filter 4 so as to minimize the error signal based on the reference signal and the error signal. The adaptive filter 4 then generates a canceling signal to cancel the vibratory noise in the passenger compartment.

Conversely, if the switching control circuit 7 judges that the audio device 60 of premium specifications is installed on the vehicle and electrically connected to the active vibratory noise control unit 30-1, then the voltage value of the control signal is of a high potential (H2), and the switching control circuit 7 controls the on-off switch 3 to shift to the contact position (ON position) shown in FIG. 2, and reads the corrective data CB from the reference signal generating circuit 5. Based on the read corrective data CB, the reference signal generating circuit 5 corrects the basic signal from the basic signal generating circuit 2, thereby generating a reference signal. Using the reference signal, the active vibratory noise control unit 30-1 cancels the vibratory noise in the passenger compartment in the same manner as when the audio device 40 of standard specifications is installed on the vehicle.

Operation of the active vibratory noise control apparatus according to the above embodiment of the present invention will be described below with reference to FIG. 3.

When normal actions for operating the audio device are made on the command key switch assembly 45, the transistor 47 is turned off, and the collector potential of the transistor 47 is high, i.e., the voltage value of the control signal is of a high potential (a high potential H1 when the audio device 40 of standard specifications is connected, and a high potential H2 when the audio device 60 of premium specifications is connected). In response to the control signal of such a high potential (H1 or H2), the switching control circuit 7 puts the active vibratory noise control unit 30-1 in a vibratory noise control mode.

When a certain action, different from normal actions for operating the audio device, is made on the command key switch assembly 45, the transistor 47 is turned on, and the collector potential of the transistor 47 becomes a ground potential, i.e., the voltage value of the control signal is of a ground potential (L). In response to the control signal of such a ground potential (L), the switching control circuit 7 controls the on-off switch 3 to shift from the contact position shown in FIG. 2 into an OFF position, putting the active vibratory noise control unit 30-1 from the vibratory noise control mode into a disabled mode.

Therefore, when the command key switch assembly 45 is operated to turn on the transistor 47, the voltage value of the control signal becomes a ground potential (L). The control signal of the ground potential is applied to the switching control circuit 7 to inactivate the active vibratory noise control unit 30-1.

As a result, the operator in a car dealer or the like may operate the command key switch assembly 45 to switch between the vibratory noise control mode and the disabled mode of the active vibratory noise control unit 30-1 to check a noise suppressing ability in those modes. In this manner, the operator can easily determine whether the active vibratory noise control unit 30-1 is suffering a failure or not.

When the control circuit 46 of the audio device 40 or 60 detects a certain action (which may be the same as the above action), different from normal actions, made on the command key switch assembly 45 while the base current is being supplied to the transistor 47, the control circuit 46 stops outputting the base current. The active vibratory noise control unit 30-1 then resumes the generation of a canceling signal depending on the control signal of the high potential (H1 or H2), i.e., is brought back into the vibratory noise control mode.

An active vibratory noise control apparatus according to another embodiment of the present invention will be described below.

Figure 4:
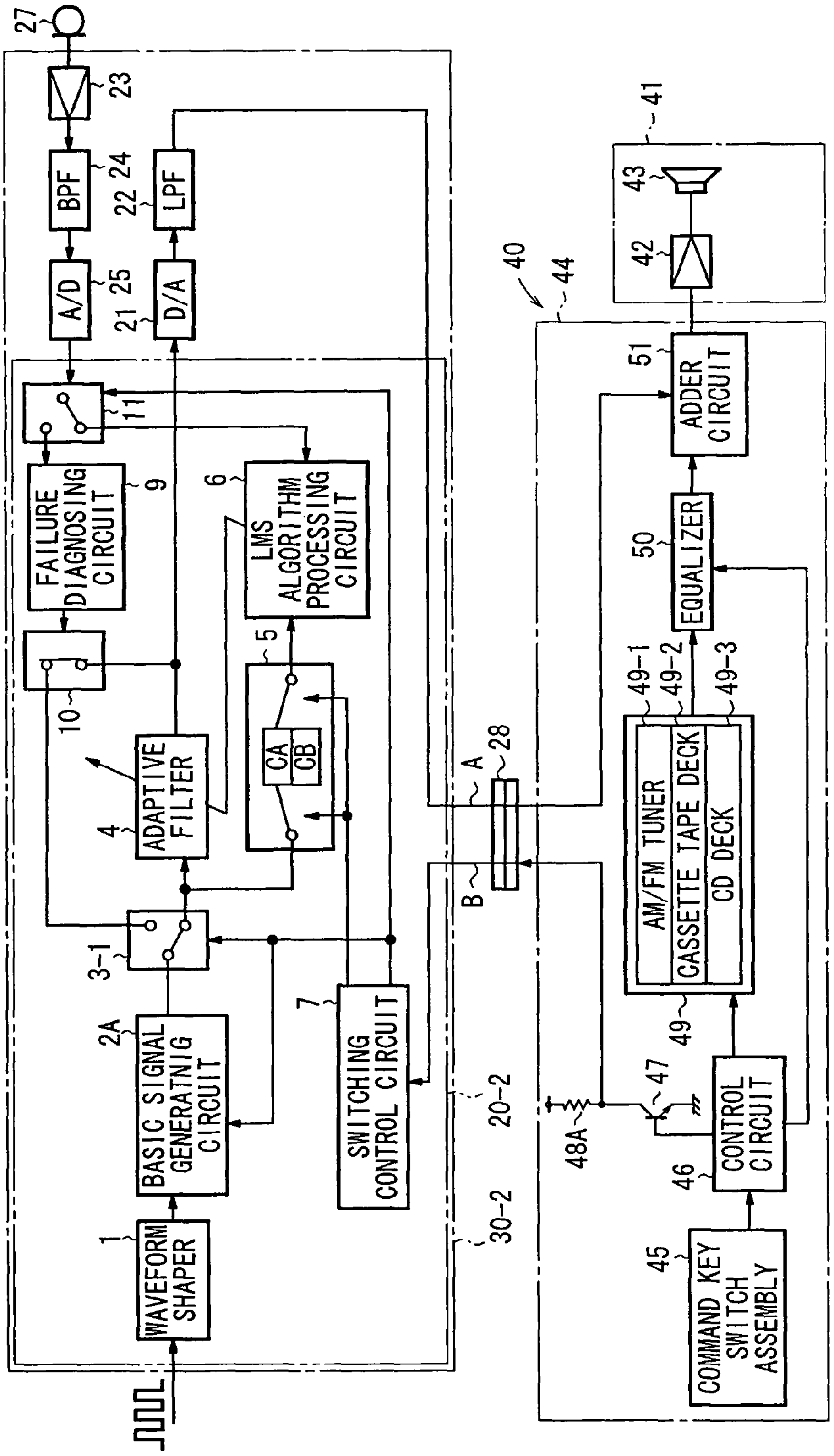
FIG. 4 is a block diagram of an active vibratory noise control apparatus according to another embodiment of the present invention, the active vibratory noise control apparatus being combined with an audio device of standard specifications installed on a vehicle.
Figure 5:
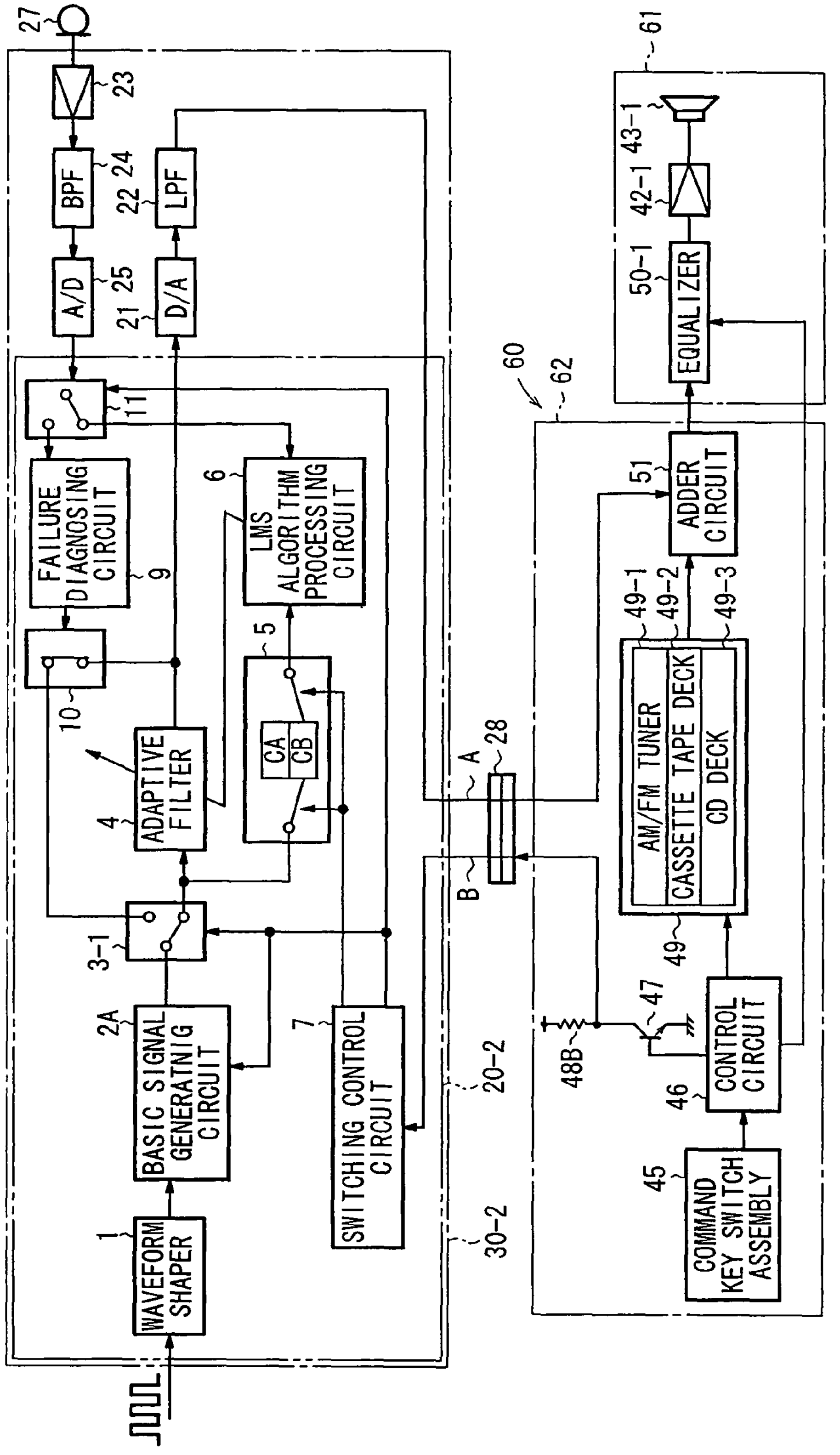
FIG. 5 is a block diagram of the active vibratory noise control apparatus according to the other embodiment of the present invention, the active vibratory noise control apparatus being combined with an audio device of premium specifications installed on a vehicle.

FIG. 4 shows in block form the active vibratory noise control apparatus according to the other embodiment, the active vibratory noise control apparatus being electrically connected to an audio device of standard specifications by a coupler. FIG. 5 shows in block form the active vibratory noise control apparatus according to the other embodiment, the active vibratory noise control apparatus being electrically connected to an audio device of premium specifications, rather than the audio device of standard specifications, by a coupler.

The audio device 40 of standard specifications and the audio device 60 of premium specifications for use with the active vibratory noise control apparatus according to the other embodiment are identical to the audio devices for use with the active vibratory noise control apparatus according to the previous embodiment, and will not be described in detail below.

The active vibratory noise control apparatus according to the other embodiment has an active vibratory noise control unit 30-2 including a canceling signal generating circuit 20-2 for generating a canceling signal. The canceling signal generating circuit 20-2, which may be implemented by a microcomputer, comprises a waveform shaper 1, a basic signal generating circuit 2A, a selector switch 3-1, an adaptive filter 4, a reference signal generating circuit 5, an LMS algorithm processing circuit 6, a switching control circuit 7 which is supplied with a control signal via a coupler 28, a failure diagnosing circuit 9, an on-off switch 10, and a selector switch 11. The active vibratory noise control unit 30-2 also has a D/A converter 21 for converting a digital canceling signal output from the canceling signal generating circuit 20-2 into an analog canceling signal, a low-pass filter 22 for filtering and supplying the analog canceling signal via the coupler 28 to the adder circuit 51, an amplifier 23 for amplifying an error signal detected by a microphone 27 serving as an error signal detecting means, a bandpass filter 24 for being supplied with an amplified error signal output from the amplifier 23, and an A/D converter 25 for converting an analog error signal output from the bandpass filter 24 into a digital error signal and supplying the digital error signal to the canceling signal generating circuit 20-2.

As described above, the active vibratory noise control unit 30-2 is similar to the active vibratory noise control unit 30-1 except that it additionally has the failure diagnosing circuit 9, the on-off switch 10, and the selector switch 11, and employs the selector switch 3-1 in place of the on-off switch 3. The active vibratory noise control unit 30-2 operates in the same way as the active vibratory noise control unit 30-1 with respect to the generation of a canceling signal.

A basic signal generated by the basic signal generating circuit 2A is sent via the selector switch 3-1 selectively to the adaptive filter 4 and the on-off switch 10. One of the canceling signal output from the adaptive filter 4 and the basic signal output via the on-off switch 10 that is controlled by the failure diagnosing circuit 9 is output to the D/A converter 21. An error signal output from the A/D converter 25 is delivered via the selector switch 11 selectively to the LMS algorithm processing circuit 6 and the failure diagnosing circuit 9. The selector switches 3-1, 11 are controlled by a switching control signal from the switching control circuit 7.

When the audio device 40 of standard specification or the audio device 60 of premium specifications is electrically connected to the active vibratory noise control unit 30-2 through the coupler 28, the switching control circuit 7 which has determined the voltage value of the control signal controls the selector switches 3-1, 11 to shift to their respective switched positions shown in FIGS. 4 and 5.

When the audio device 40 of standard specification is electrically connected to the active vibratory noise control unit 30-2 through the coupler 28, the reference signal generating circuit 5 reads the corrective data CA. When the audio device 60 of premium specification is electrically connected to the active vibratory noise control unit 30-2 through the coupler 28, the reference signal generating circuit 5 reads the corrective data CB. As with the active vibratory noise control unit 30-1, the adaptive filter 4 generates a canceling signal to cancel vibratory noise in the passenger compartment.

Specifically, the control signal from the audio unit 44 or 62 is supplied to the switching control circuit 7 to enable the switching control circuit 7 to judge the type of the audio device 40 or 60 that is installed on the vehicle.

As a result, the canceling signal corresponding to the audio device 40 or 60 that is judged is automatically generated by the active vibratory noise control unit 30-2 to cancel vibratory noise in the passenger compartment. Therefore, the same active vibratory noise control unit 30-2 can be used in combination with both the audio devices 40, 60. It is not necessary to manually adjust the active vibratory noise control unit 30-2 depending on the audio device 40 or 60 at the time the active vibratory noise control unit 30-2 is assembled in the vehicle.

When a certain action, different from normal actions for operating the audio device, made on the command key switch assembly 45 is detected by the control circuit 46, e.g., when the power on/off switch is pressed a predetermined number of times while the mute switch is being pressed, the switching control circuit 7 is supplied with the control signal of ground potential L from the audio device 40 or 60. In response to the control signal of ground potential L, the active vibratory noise control unit 30-2 is put into a failure diagnosing mode. The switching control circuit 7 controls the basic signal generating circuit 2A to generate a basic sine-wave signal having an audio frequency not related to the vibratory noise, rather than a basic signal having a frequency selected from the frequencies of vibratory noise generated by a vibratory noise source. The switching control circuit 7 also controls the selector switches 3-1, 11 to shift from their respective switched positions shown in FIGS. 4 and 5, outputting the basic sine-wave signal, instead of the canceling signal, to the adder circuit 51.

In the failure diagnosing mode, the vibratory noise in the passenger compartment is not canceled, but the speaker 43 (43-1) is driven by the basic sine-wave signal from the basic signal generating circuit 2A to produce a particular audible sound. By confirming the produced particular audible sound, the operator can judge that the line including the speaker 43 (43-1) and ranging from the selector switch 3-1 to the speaker 43 (43-1) is normal. If no particular audible sound is produced by the speaker 43 (43-1), then the operator can judge that the speaker 43 (43-1) is broken or malfunctioning or the line ranging from the selector switch 3-1 to the speaker 43 (43-1) is broken or malfunctioning. Therefore, the operator of the command key switch assembly 45 can determine whether the speaker 43 (43-1) and the line ranging from the selector switch 3-1 to the speaker 43 (43-1) is normal or malfunctioning.

When the particular audible sound is produced by the speaker 43 (43-1) in response to the basic sine-wave signal from the basic signal generating circuit 2A; the particular audible sound is detected by the microphone 27. An output signal from the microphone 27 is supplied via the selector switch 11 to the failure diagnosing circuit 9, which then diagnoses the microphone 27 for a failure. Specifically, if the output signal produced by the microphone 27 in response to the basic sine-wave signal has the same frequency as the basic sine-wave signal and has its voltage level inverted between positive and negative levels, then the failure diagnosing circuit 9 diagnoses that the microphone 27 is normal. If the microphone 27 produces an output signal having only a positive or negative level for a predetermined time (e.g., 5 seconds) though the microphone 27 detects the sound that is produced by the speaker 43 (43-1) in response to the basic sine-wave signal, then the failure diagnosing circuit 9 diagnoses that the microphone 27 is malfunctioning.

When the failure diagnosing circuit 9 diagnoses that the microphone 27 is malfunctioning, the failure diagnosing circuit 9 shifts the on-off switch 10 from the position shown in FIG. 4 or 5 to an off position, turning off the production of the particular audible sound. Since the particular audible sound is turned off after elapse of a certain period of time, the operator of the command key switch assembly 45 is able to judge that the microphone 27 is malfunctioning.

Figure 7:
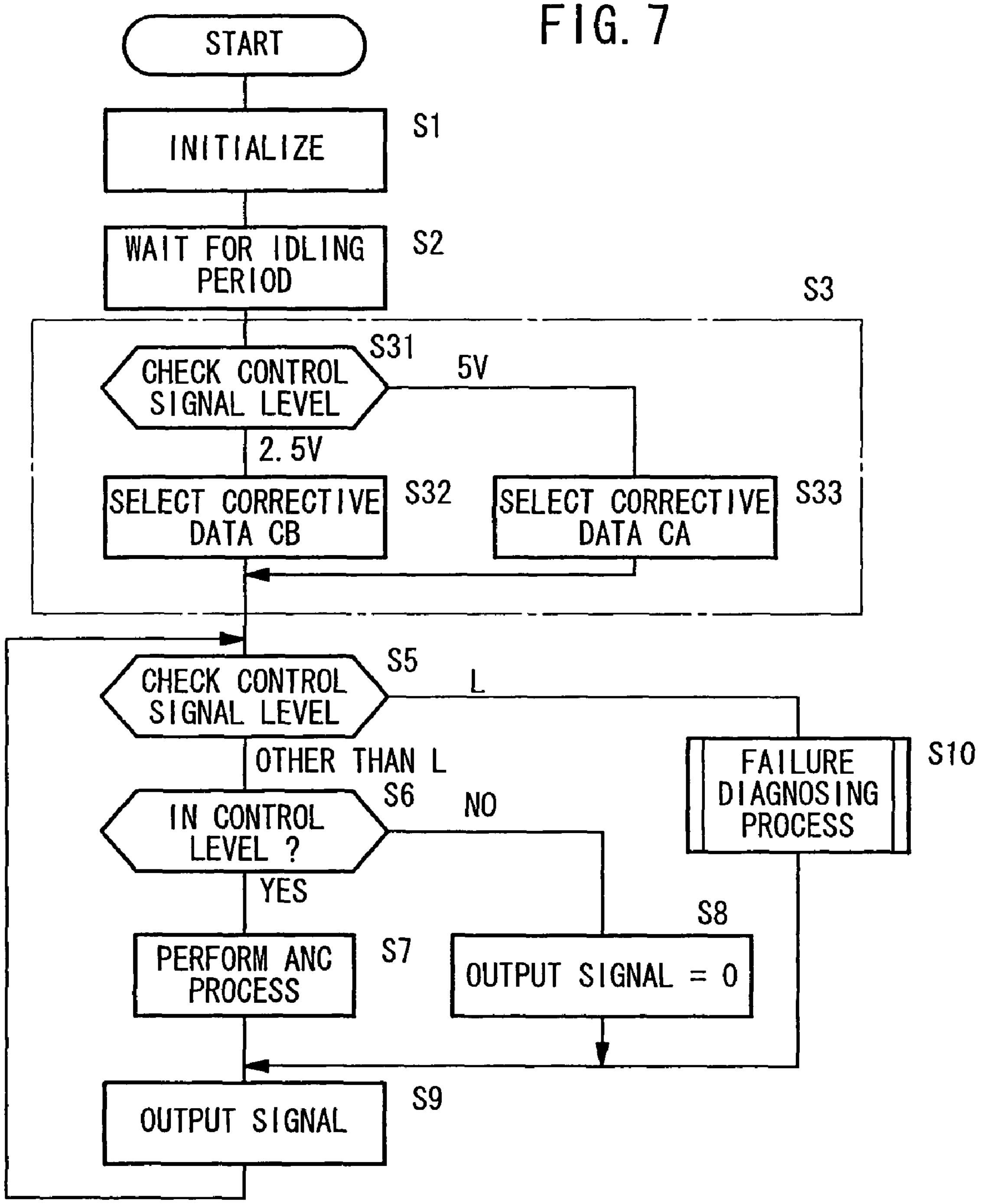
FIG. 7 is a flowchart of an operation sequence of the active vibratory noise control apparatus according to the other embodiment of the present invention.

The above operation of the active vibratory noise control apparatus will be described below with reference to FIGS. 6 through 8.

When the switching control circuit 7 is supplied with the high-potential output signal (H1) as shown in FIG. 6, the switching control circuit 7 judges that the audio device installed on the vehicle is the audio device 40 of standard specifications, and the corrective data CA is read by the reference signal generating circuit 5. When the switching control circuit 7 is supplied with the high-potential output signal (H2) as shown in FIG. 6, the switching control circuit 7 judges that the audio device installed on the vehicle is the audio device 60 of premium specifications, and the corrective data CB is read by the reference signal generating circuit 5. When the switching control circuit 7 is supplied with the low-potential output signal (L) as shown in FIG. 6, the active vibratory noise control apparatus is brought out of the vibratory noise control mode for generating a canceling signal, and enters the failure diagnosing mode.

Details of the above operation will be described below with reference to FIGS. 7 and 8. When the active vibratory noise control apparatus is activated, it is initialized in step S1 (see FIG. 7), and then waits for an idling period in step S2. Then, an active vibratory noise control routine is executed in step S3. In the active vibratory noise control routine, the level of a control signal supplied to the switching control circuit 7 is checked in step S31. If the level of the control signal is a high-potential level H1 (=5 V), then the corrective data CA is selected in step S33. If the level of the control signal is a high-potential level H2 (=2.5 V), then the corrective data CB is selected in step S32.

After step S3, the level of the control signal is checked in step S5. If the level of the control signal is other than the ground potential (=L), then it is determined whether the vehicle speed is higher than 0 km/h or not, i.e., whether the vehicle speed is in a control range or not, in step S6. If it is judged that the vehicle speed is higher than 0 km/h (i.e., the vehicle is running), i.e., if the vehicle speed is in the control range, in step S6, then the active vibratory noise control unit 30-2 is energized to perform an active vibratory noise control process (ANC process) in step S7. The active vibratory noise control unit 30-2 outputs a canceling signal in step S9. Thereafter, the processing from step S5 is repeated.

If it is judged that the vehicle speed is 0 km/h (i.e., the vehicle is at rest), i.e., if the vehicle speed is not in the control range, in step S6, then the canceling signal (output signal) is set to 0 in step S8. The nil canceling signal is output in step S9, after which the processing from step S5 is repeated. When step S8 is executed, the vehicle is at rest, and there is no need for canceling vibratory noise in the passenger compartment.

If the level of the control signal is the ground potential (=L) in step S5, then a failure diagnosing process is performed in step S10. In step S10, the failure diagnosing process is performed as shown in FIG. 8.

Figure 8:
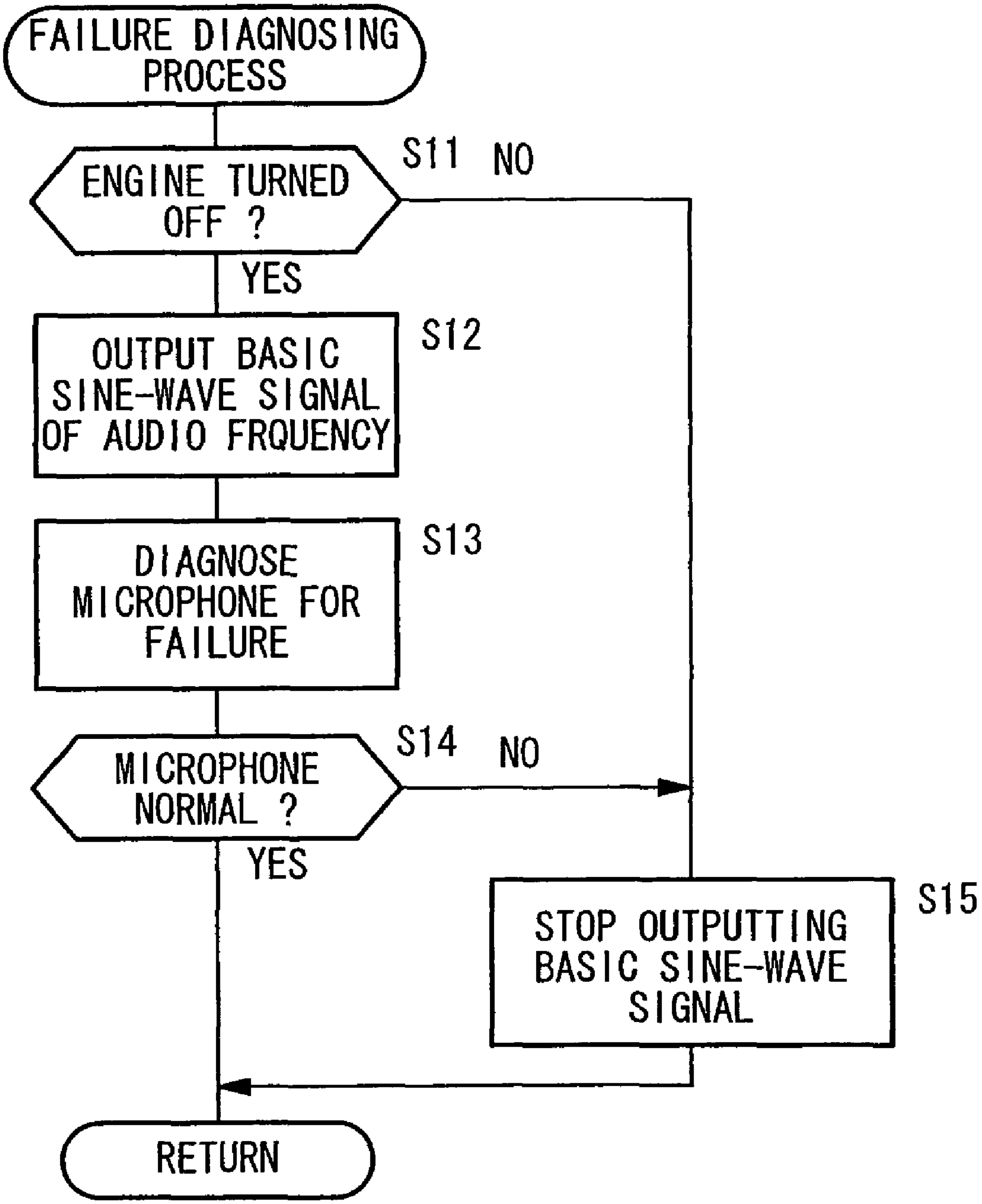
FIG. 8 is a flowchart of a failure diagnosing process in the operation sequence of the active vibratory noise control apparatus according to the other embodiment of the present invention.
Figure 9:
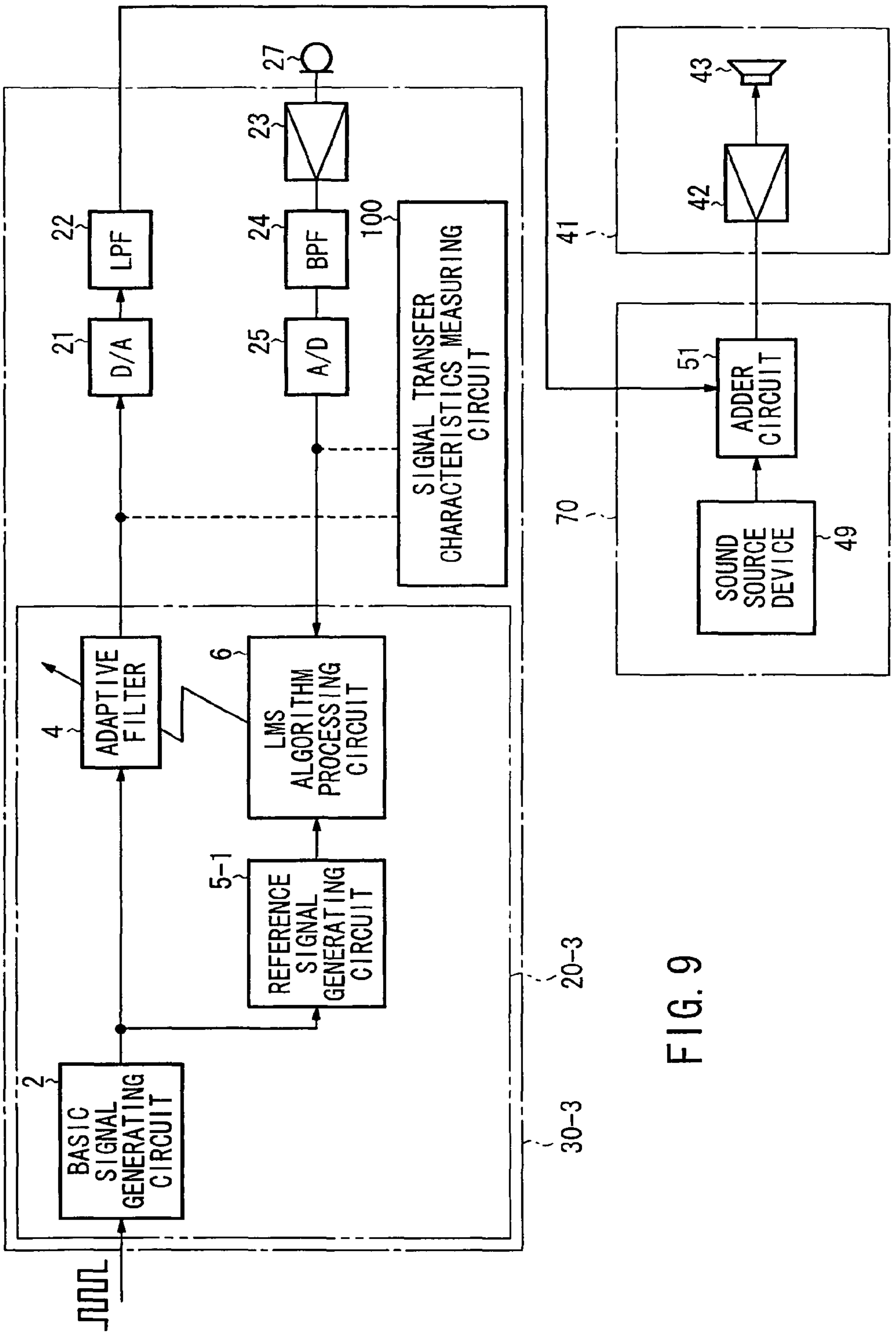
FIG. 9 is a block diagram of a conventional active vibratory noise control apparatus.
Figure 10A:
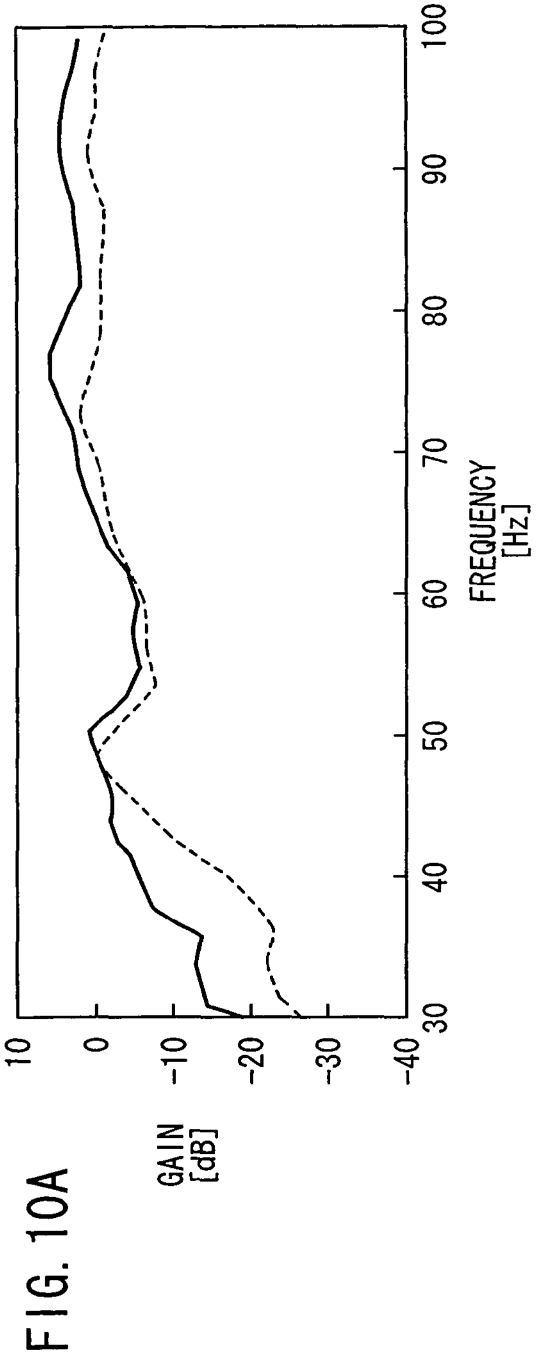
FIGS. 10A and 10B are diagrams showing signal transfer characteristics in active vibratory noise control apparatus, FIG. 10A showing gain characteristics, and FIG. 10B showing phase characteristics.
Figure 10B:
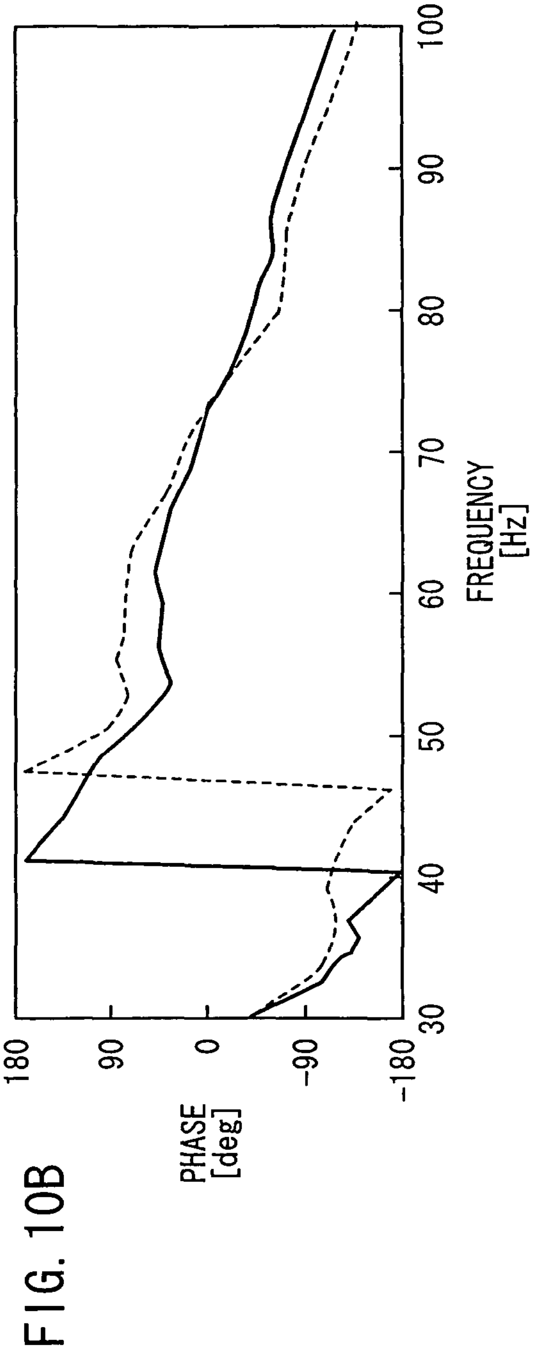

In the failure diagnosing process shown in FIG. 8, it is determined whether the engine of the vehicle is turned off or not in step S11. If it is judged that the engine of the vehicle is turned off in step S11, then the basic signal generating circuit 2A generates the basic sine-wave signal in step S12. Thereafter, the microphone 27 is diagnosed for a failure in step S13.

In step S13, the microphone 27 is diagnosed for a failure based on the output signal from the microphone 27 as described above.

Based on the results of the failure diagnosis of the microphone 27, it is checked whether the microphone 27 is normal or malfunctioning in step S14. If the microphone 27 is judged as being normal, then control returns from the failure diagnosing process shown in FIG. 8 to the main routine shown in FIG. 7.

If the microphone 27 is judged as malfunctioning in step S14, the on-off switch 10 is turned off, stopping the outputting of the basic sine-wave signal in step S15. If it is judged that the engine of the vehicle is not turned off in step S11, then the outputting of the basic sine-wave signal is also stopped in step S15. Thereafter, control returns from the failure diagnosing process shown in FIG. 8 to the main routine shown in FIG. 7.

The above failure diagnosing process can simply be performed by operating the command key switch assembly 45 of the audio device 40 or 60. For example, when the operator puts the active vibratory noise control unit 30-2 into the failure diagnosing mode in a car dealer or the like, if the operator does not hear the particular audible sound at all based on the basic sine-wave signal, then the operator can judge that the signal line A is broken or an output system of the active vibratory noise control unit 30-2 is suffering a failure, or if the operator hears the particular audible sound for a predetermined period of time (e.g., 5 seconds) and then the particular audible sound is stopped, then the operator can judge that the microphone 27 is malfunctioning, or if the operator hears an audible sound while the engine is in operation, then the operator can judge that an input system of the active vibratory noise control unit 30-2 is suffering a failure.

In addition, since the active vibratory noise control unit 30-2 outputs an audible sound to determine whether it is suffering a failure or not, it does not need another output means for failure diagnosis, such as a warning light or the like. Therefore, the active vibratory noise control unit 30-2 is relatively inexpensive to manufacture.

In the illustrated embodiments, a pull-up resistor is used to produce different control signals for determining the type of the audio device that is connected to the active vibratory noise control unit. However, the control circuit 46 may be arranged to output a certain voltage value indicative of an audio device type to the active vibratory noise control unit 30-2 in response to a signal from the command key switch assembly 45.

With the active vibratory noise control apparatus according to the present invention, the active vibratory noise control unit can determine the type of the audio device installed on the vehicle based on the control signal from the audio device, and can generate a canceling signal for the speaker of the installed audio device to cancel vibratory noise in the passenger compartment. The single active vibratory noise control unit can thus be used in combination with different audio devices. The active vibratory noise control unit is also capable of easily diagnosing the speaker and the error signal detecting means for a failure.

Although certain preferred embodiments of the present invention have been shown and described in detail, it should be understood that various changes and modifications may be made therein without departing from the scope of the appended claims.

What is claimed is:

1. An active vibratory noise control apparatus comprising:

an audio device having a speaker for outputting a reproduced sound; and an active vibratory noise control unit for generating a canceling signal to reduce vibratory noise in a passenger compartment of a vehicle and outputting the canceling signal to said speaker;

said active vibratory noise control unit being connected to said audio device selected from a plurality of types of audio devices having different speaker or amplifier characteristics, said audio device including a control signal generating means for generating a control signal corresponding to the type of said audio device to said active vibratory control unit, wherein:

said active vibratory noise control unit further comprises:

a basic signal generator means for outputting a basic signal having a frequency selected from frequencies of vibratory noise generated by a vibratory noise source;

an adaptive filter for outputting the cancelling signal based on said basic signal in order to cancel vibratory noise in the passenger compartment;

an error signal detecting means for detecting vibratory noise in the passenger compartment and outputting an error signal representing the detected vibratory noise;

a reference signal generating means for generating a reference signal by correcting said basic signal with a corrective value, wherein said reference signal generating means selectively reads the corrective value from a plurality of stored corrective values depending on the control signal received from said audio device, the corrective value being based on signal transfer characteristics corresponding to the type of audio device associated with the control signal; and a filter coefficient updating means for sequentially updating filter coefficients of said adaptive filter to minimize said error signal based on said error signal and said reference signal.

2. The active vibratory noise control apparatus according to claim 1, wherein said active vibratory noise control unit stops outputting said canceling signal based on the control signal from said audio device.

3. An active vibratory noise control apparatus comprising:

an audio device having a speaker for outputting a reproduced sound; and an active vibratory noise control unit having error signal detecting means for detecting vibratory noise in a passenger compartment of a vehicle and outputting an error signal representing the detected vibratory noise, the active vibratory noise control unit being adapted to generate a canceling signal to minimize the error signal for reducing vibratory noise in the passenger compartment of the vehicle and outputting the canceling signal to said speaker; wherein said audio device has a command key switch operable by an operator, and control signal generating means for outputting a control signal based on a specific action made on said command key switch;

said active vibratory noise control unit is arranged to shift into a failure diagnosing mode based on the control signal from said control signal generating means, said active vibratory noise control unit determines whether an engine of the vehicle is turned off or not when said active vibratory noise control unit shifts into said failure diagnosing mode, wherein when it is determined that the engine is turned off in said failure diagnosing mode, said active vibratory noise control unit outputs a basic sine-wave signal having an audio frequency instead of the canceling signal and determines, after the elapse of a predetermined time, whether there is a failure or not in said error signal detecting means based on an output signal output from said error signal detecting means, failure being indicated when a voltage level of the output signal is only a positive or a negative level for the predetermined time, and said active vibratory noise control unit stops outputting said basic sine-wave signal having said audio frequency if it is judged that there is a failure, and wherein when it is determined that the engine is not turned off, but in operation, in said failure diagnosing mode, said active vibratory noise control unit stops outputting said basic sine-wave signal having said audio frequency.

4. The active vibratory noise control apparatus according to claim 1, wherein the corrective value is selected by the reference signal generating means based on a voltage value of the control signal that is supplied from the audio device.

5. The active vibratory noise control apparatus according to claim 4, further comprising at least two signal lines, wherein one of the signal lines transmits the cancelling signal from the active vibratory noise control unit to the audio device and another of the signal lines transmits the control signal from the audio device to the active vibratory noise control unit depending on the type of audio device associated with the control signal.

* * * * *